US012661689B2

(12) United States Patent
Sato et al.

(10) Patent No.: US 12,661,689 B2
(45) Date of Patent: Jun. 23, 2026

(54) METHOD FOR FORMING MULTILAYER FILM AND MULTILAYER FILM

(71) Applicants: KANSAI PAINT CO., LTD., Amagasaki (JP); NISSAN MOTOR CO., LTD., Yokohama (JP)

(72) Inventors: Shingo Sato, Kanuma (JP); Mutsumi Yamazaki, Hiratsuka (JP); Yuko Iwara, Yokohama (JP); Tatsuya Suzuki, Yokohama (JP); Hironori Tsutsui, Yokohama (JP)

(73) Assignees: KANSAI PAINT CO., LTD., Amagasaki (JP); NISSAN MOTOR CO., LTD., Yokohama (JP)

( * ) Notice: Subject to any disclaimer, the term of this patent is extended or adjusted under 35 U.S.C. 154(b) by 54 days.

(21) Appl. No.: 18/872,619

(22) PCT Filed: Jun. 6, 2023

(86) PCT No.: PCT/JP2023/021048
§ 371 (c)(1),
(2) Date: Dec. 6, 2024

(87) PCT Pub. No.: WO2023/238873
PCT Pub. Date: Dec. 14, 2023

(65) Prior Publication Data

US 2025/0360536 A1 Nov. 27, 2025

(30) Foreign Application Priority Data

Jun. 7, 2022 (JP) ................................ 2022-092241

(51) Int. Cl.
*B05D 5/06* (2006.01)
*B05D 3/06* (2006.01)
*B05D 7/00* (2006.01)

(52) U.S. Cl.
CPC ............ *B05D 5/066* (2013.01); *B05D 3/063* (2013.01); *B05D 7/572* (2013.01); *B05D 7/574* (2013.01); *B05D 2210/00* (2013.01); *B05D 2401/10* (2013.01); *B05D 2401/20* (2013.01); *B05D 2502/005* (2013.01); *B05D 2520/00* (2013.01); *B05D 2601/08* (2013.01); *B05D 2601/10* (2013.01); *B05D 2601/20* (2013.01); *B05D 2601/22* (2013.01)

(58) Field of Classification Search
None
See application file for complete search history.

(56) References Cited

U.S. PATENT DOCUMENTS

| | | | | |
|---|---|---|---|---|
| 6,096,378 | A | 8/2000 | Komatsu et al. | |
| 2007/0172692 | A1 | 7/2007 | Kamimori et al. | |
| 2020/0010698 | A1 | 1/2020 | Kurashina et al. | |
| 2020/0061668 | A1 | 2/2020 | Omura et al. | |
| 2022/0250115 | A1 * | 8/2022 | Ohnuki .................... | B05D 7/14 |
| 2024/0327657 | A1 * | 10/2024 | Czornij .................... | B05D 7/14 |

FOREIGN PATENT DOCUMENTS

| | | | |
|---|---|---|---|
| JP | 61-74662 | A | 4/1986 |
| JP | 10-137677 | A | 5/1998 |
| JP | 2002-273321 | A | 9/2002 |
| JP | 2004-298837 | A | 10/2004 |
| JP | 2006-95522 | A | 4/2006 |
| JP | 2006-326538 | A | 12/2006 |
| JP | 2007-216220 | A | 8/2007 |
| JP | 2011-131135 | A | 7/2011 |
| JP | 2018-171614 | A | 11/2018 |
| WO | WO 2018/181193 | A1 | 10/2018 |
| WO | WO 2021/014859 | A1 | 1/2021 |

OTHER PUBLICATIONS

International Search Report (PCT/ISA/210), issued in PCT/JP2023/021048, dated Sep. 5, 2023.

* cited by examiner

*Primary Examiner* — Michael P. Rodriguez
(74) *Attorney, Agent, or Firm* — Birch, Stewart, Kolasch & Birch, LLP

(57) ABSTRACT

A method for forming a multilayer film, including: a step (1) of applying an aqueous two-pack first colored coating material on an automobile outer panel to form an uncured first colored coating film; a step (2) of applying an aqueous one-pack white color coating material on the uncured first colored coating film to form an uncured white coating film; a step (3) of setting the uncured white coating film for 4 minutes or more such that a resultant coating film has a solid content of 50% by mass or more; a step (4) of applying an aqueous one-pack interference color coating material on the uncured white coating film having the solid content of 50% by mass or more to form an uncured interference color coating film; a step (5) of applying a solvent-based two-pack clear coating material on the uncured interference color coating film to form an uncured clear coating film; and a step (6) of heating the coating films formed in the steps (1) to (5) at a temperature of 75° C. or more and to 100° C. or less to simultaneously cure the coating films.

10 Claims, No Drawings

METHOD FOR FORMING MULTILAYER FILM AND MULTILAYER FILM

TECHNICAL FIELD

The present disclosure relates to a method for forming a multilayer film and a multilayer film.

BACKGROUND ART

In automotive painting, a method for forming a multilayer film by a 3-coat 2-bake (3C2B) system has been widely adopted, that includes, in this order, application of an electrodeposition coating material on an article to be coated, application of an intermediate coating material, bake curing, application of an aqueous base coating material, preheating, application of a clear coating material, and bake curing. However, in recent years, from the viewpoint of energy saving, a 3-coat 1-bake (3C1B) system has been tried, that omits the bake curing step after the application of an intermediate coating material, and includes, in this order, application of an electrodeposition coating material on an article to be coated, application of an aqueous intermediate coating material, preheating, application of an aqueous base coating material, preheating, application of a clear coating material, and bake curing.

Recently, for the purposes of reducing equipment costs in the manufacturing process of automobile outer panels and of matching the color tones of metal members and plastic members, there is a demand for a method for integrally coating a metal member and a plastic member attached to the metal member.

For example, Patent Literature 1 discloses a coating method for continuously coating an automobile body, which is characterized by that: after applying an undercoat material on an automobile body, resinous parts are attached to the body; a conductive primer is applied mainly on the resinous parts; an intermediate coating material is applied; and a top coat material is applied to integrally coat the resinous parts and the automobile body.

Patent Literature 2 discloses a method for forming a multilayer film, in which: an aqueous intermediate coating material is applied on a substrate having both a steel plate and a plastic substrate to form an intermediate coating film; an aqueous base coating material is applied on the formed intermediate coating film to form a base coating film; an organic solvent type clear coating material is applied to form a clear coating film; and the three layers of the intermediate coating film, the base coating film, and the clear coating film are heat cured, characterized by that the aqueous base coating material contains, in 100% by mass of the resin solid content, (a) 10 to 60% by mass of an acrylic resin emulsion obtained by emulsion polymerization of a monomer mixture containing 0.2 to 20% by mass of a crosslinking monomer as the solid content, (b) 5 to 40% by mass of a water-soluble acrylic resin as the solid content, and (c) 20 to 40% by mass of a melamine resin as the solid content, and (d) 10 to 40 parts by mass of propylene glycol monoalkyl ether as the solid content relative to 100 parts by mass of the resin solid content of the coating material.

On the other hand, among exterior colors of industrial products such as automobiles, colors whose appearance changes depending on the viewing angle, that is, colors that have high lightness in highlight (when a coated panel is viewed in the vicinity of the specularly reflected light) and show a large change in color when the viewing angle is changed from highlight to shade (when the coated panel is viewed obliquely) are called colors with high flip-flop properties and are in high demand since they are generally considered to have effects of emphasizing the shapes of industrial products. In addition, white pearl color is highly popular since it is thought to exude a sense of luxury. In recent years, there is a demand for a white pearl color with high flip-flop properties. For example, Patent Literature 3 and Patent Literature 4 disclose a method for forming a white pearl coating film that provides a pearl coating film with high flip-flop properties and excellent white pearl appearance.

CITATION LIST

Patent Literature

[Patent Literature 1] Japanese Unexamined Patent Application Publication No. S61 (1986)-74682
[Patent Literature 2] Japanese Unexamined Patent Application Publication No. 2011-131135
[Patent Literature 3] Japanese Unexamined Patent Application Publication No. 2006-326538
[Patent Literature 4] International Publication No. 2021-014859

SUMMARY OF THE DISCLOSURE

Technical Problem

If the baking temperature is lowered in the aforementioned methods disclosed in Patent Literatures 1 and 2, it becomes difficult to ensure film performance such as finished appearance and water resistance. In addition, from the viewpoint of further energy saving, there is a demand for an integrated coating system that can perform curing at lower temperatures while maintaining film performance.

Although the inventions disclosed in Patent Literatures 3 and 4 have high designability such as lightness in highlight and flip-flop properties, there is still room for further improvement.

The present disclosure has been made in view of the above circumstances and provides a method for forming a multilayer film that forms a whitish multilayer film excellent in low temperature curing properties, finished appearance and designability on both a metal member and a plastic member of an automobile outer panel, and a multilayer film formed by the method.

Solution to the Problem

The present disclosure provides a method for forming a multilayer film, including: a step (1) of applying an aqueous two-pack first colored coating material (X) on both a metal member and a plastic member of an automobile outer panel to form an uncured first colored coating film; a step (2) of applying an aqueous one-pack white color coating material (Y-1) on the uncured first colored coating film obtained in the step (1) to form an uncured white coating film; a step (3) of setting the uncured white coating film obtained in the step (2) such that a resultant coating film has a solid content of 50% by mass or more; a step (4) of applying an aqueous one-pack interference color coating material (Y-2) on the uncured white coating film having the solid content of 50% by mass or more obtained in the step (3) to form an uncured interference color coating film; a step (5) of applying a solvent-based two-pack clear coating material (Z) on the uncured interference color coating film obtained in the step (4) to form an uncured clear coating film; and a step (6) of heating the uncured first colored coating film, the uncured white coating film, the uncured interference color coating film, and the uncured clear coating film formed in the steps (1) to (5) at a temperature of 75° C. or more and 100° C. or less to simultaneously cure these coating films to form a multilayer film. The aqueous one-pack interference color coating material (Y-2) contains a vehicle-forming resin (A), and a titanium oxide-coated alumina flake pigment (B) having a mean particle diameter in the range from 10 μm or more to 14 μm or less. The aqueous one-pack interference color coating material (Y-2) contains 15 parts by mass or more and 21 parts by mass or less of the titanium oxide-coated alumina flake pigment (B) based on 100 parts by mass of the vehicle-forming resin (A). The aqueous one-pack interference color coating material (Y-2) has a coating material solid content of 18% by mass or more and 22% by mass or less. The interference color coating film has a cured film thickness of 4 μm or more and 7 μm or less. The solvent-based two-pack clear coating material (Z) contains a hydroxyl group-containing acrylic resin (Z1) and a polyisocyanate compound (Z2) in a ratio such that isocyanate groups in the polyisocyanate compound (Z2) is 1.5 equivalents or more and 2.0 equivalents or less relative to 1 equivalent of hydroxyl groups in the hydroxyl group-containing acrylic resin (Z1). The polyisocyanate compound (Z2) contains a polyisocyanate compound having a uretdione structure and a diisocyanate trimer or higher compound in a solid content mass ratio of 10/90 or more and 50/50 or less. The multilayer film has a lightness L* (15°) of 113 or more and 120 or less, a sparkle intensity Si (45°) of 3 or more and 5 or less, and a reciprocal of graininess 1/G of 0.4 or more and 0.5 or less, when measured by a multi-angle colorimeter.

It is preferred that the aqueous one-pack white color coating material (Y-1) contains a hydroxyl group-containing polyester resin (Y1), a hydroxyl group-containing acrylic resin (Y2), a hydroxyl group-containing polyurethane resin (Y3), and a melamine resin (Y4), and the uncured white coating film has a water absorption rate of 6.5% or less at 20° C.

It is preferred that the plastic member is coated with a primer in advance.

It is preferred that the plastic member is made of a composite material of a polyamide resin and a modified polyphenylene ether resin.

It is preferred that the solvent-based two-pack clear coating material (Z) further contains polysiloxane modified silica particles (Z3) having a mean primary particle diameter of 1 nm or more and 40 nm or less.

A multilayer film of the present disclosure is a multilayer film obtained by the method for forming the multilayer film of the present disclosure.

Since the multilayer film of the present disclosure is obtained by providing an uncured white coating film, an uncured interference color coating film, and an uncured clear coating film in this order, and then simultaneously curing these coating films, it is presumed that a region where the compositions of the coating films are partially mixed is formed at the interface of the coating films. In addition, since the cured product contains polymers, it is difficult to define the structure of the multilayer film using a general formula, etc., and it is also difficult to define the multilayer film by its characteristics. That is, the multilayer film of the present disclosure can be defined for the first time by the method for forming the multilayer film of the present disclosure.

Thus, there are circumstances in which it is impossible or impractical to directly define the multilayer film of the present disclosure by its structure or characteristics.

Advantageous Effects of the Disclosure

According to the method of the present disclosure, it is possible to form a whitish multilayer film excellent in low temperature curing properties, finished appearance and designability on both a metal member and a plastic member of an automobile outer panel.

DESCRIPTION OF EMBODIMENTS

Hereinafter, a method for forming a multilayer film of the present disclosure will be described for each step in order.

[Step (1)]

In step (1) of the present disclosure, an aqueous two-pack first colored coating material (X) is applied on both a metal member and a plastic member of an automobile outer panel to form an uncured first colored coating film.

Examples of a material of the metal member include iron, aluminum, brass, copper, tin plate, stainless steel, zinc-plated steel, and zinc alloy (e.g. Zn—Al, Zn—Ni, Zn—Fe, etc.)-plated steel. It is desirable that a surface of the metal member has been subjected to a surface treatment such as phosphate treatment, chromate treatment or complex oxide treatment, and further to cationic electrodeposition coating.

Examples of a material of the plastic member include polyolefins obtained by (co)polymerizing one or two or more olefins having 2 to 10 carbon atoms such as ethylene, propylene, butylene and hexene; polycarbonates, ABS resins, urethane resins, polyamide resins, and a composite material of a polyamide resin and a modified polyphenylene ether resin. Examples of the plastic member include a bumper, a spoiler, a grill, and a fender. These plastic members may have been coated with a primer as necessary. As the primer, a conventionally known primer containing a chlorinated polyolefin, a blocked isocyanate resin, an epoxy resin, etc. may be used. The metal member and the plastic member may be assembled by a known method.

The aqueous two-pack first colored coating material (X) preferably contains a hydroxyl group-containing polyester resin (X1), a hydroxyl group-containing acrylic resin (X2), a hydroxyl group-containing polyurethane resin (X3), and a polyisocyanate compound (X4) as film-forming components. From the viewpoint of low temperature curing properties, these are preferably contained in a ratio such that isocyanate groups in the polyisocyanate compound (X4) is 1.5 equivalents or more and 2.0 equivalents or less, and more preferably 1.5 equivalents or more and 1.9 equivalents or less, relative to 1 equivalent of hydroxyl groups in the hydroxyl group-containing polyester resin (X1), the hydroxyl group-containing acrylic resin (X2), and the hydroxyl group-containing polyurethane resin (X3).

The hydroxyl group-containing polyester resin (X1) encompasses a hydroxyl group-containing polyester resin obtained by neutralizing a polyester resin usually prepared by esterification reaction using a polyhydric alcohol and a polybasic acid as well as, if necessary, a monobasic acid, an oil component (including a fatty acid thereof), etc. It is appropriate that the polyester resin usually has a weight average molecular weight in the range from about 3,000 or more to 100,000 or less, preferably from 4,000 or more to 70,000 or less, and more preferably from 5,000 or more to 30,000 or less.

Examples of the polyhydric alcohol include an ethylene oxide adduct or a propylene oxide adduct of ethylene glycol, diethylene glycol, propylene glycol, butanediol, pentanediol, hexanediol, 2,2-dimethylpropanediol, glycerin, trimethylolpropane, pentaerythritol, and a bisphenol compound. These may be used alone or in combination of two or more.

Examples of the polybasic acid include phthalic acid, isophthalic acid, tetrahydrophthalic acid, hexahydrophthalic acid, maleic acid, succinic acid, adipic acid, sebacic acid, trimellitic acid, pyromellitic acid, and anhydrides thereof. These may be used alone or in combination of two or more. Examples of the monobasic acid include benzoic acid, and t-butylbenzoic acid. Examples of the oil component include castor oil, dehydrated castor oil, safflower oil, soybean oil, linseed oil, tall oil, coconut oil, and fatty acids thereof. These may be used alone or in combination of two or more.

Introduction of carboxyl groups to the above polyester resin can be easily conducted, for example, by using in combination polybasic acids such as trimellitic acid and pyromellitic acid that have three or more carboxyl groups in one molecule, as part of the polybasic acid component, or by adding a half ester of dicarboxylic acid. Introduction of hydroxyl groups can be easily conducted, for example, by using in combination polyhydric alcohols such as glycerin and trimethylolpropane that have three or more hydroxyl groups in one molecule, as part of the polyhydric alcohol component.

Carboxylic groups in the hydroxyl group-containing polyester resin (X1) can be neutralized with a basic substance. The basic substance may preferably be a water-soluble basic substance, examples of which include ammonia, methylamine, ethylamine, propylamine, butylamine, dimethylamine, trimethylamine, triethylamine, ethylenediamine, morpholine, methylethanolamine, dimethylethanolamine, diethanolamine, triethanolamine, diisopropanolamine, and 2-amino-2-methylpropanol. These may be used alone or in combination of two or more.

The hydroxyl group-containing polyester resin (X1) preferably has an acid value usually in the range from 10 mgKOH/g or more to 100 mgKOH/g or less, preferably from 20 mgKOH/g or more to 80 mgKOH/g or less, and particularly from 20 mgKOH/g or more to 50 mgKOH/g or less; and a hydroxyl value usually in the range from 10 mg KOH/g or more to 300 mg KOH/g or less, preferably from 30 mg KOH/g or more to 200 mg KOH/g or less, and particularly from 50 mg KOH/g or more to 200 mg KOH/g or less.

Examples of the hydroxyl group-containing acrylic resin (X2) include: a water-soluble acrylic resin that is obtained by copolymerizing a monomer mixture consisting of a hydrophilic group-containing polymerizable unsaturated monomer such as a hydroxyl group-containing polymerizable unsaturated monomer and a carboxyl group-containing polymerizable unsaturated monomer, and another polymerizable unsaturated monomer, and that has a weight average molecular weight of 5,000 or more and 100,000 or less, preferably 10,000 or more and to 90,000 or less, and more preferably 20,000 or more and to 80,000 or less; and an acrylic resin emulsion having a weight average molecular weight of 50,000 or more, preferably 75,000 or more, and more preferably 100,000 or more.

Examples of the hydroxyl group-containing polymerizable unsaturated monomer include a hydroxyalkyl ester of acrylic acid or methacrylic acid such as 2-hydroxyethyl (meth)acrylate, 2- or 3-hydroxypropyl (meth)acrylate or 4-hydroxybutyl (meth)acrylate; polyethylene glycol (meth) acrylate; and polypropylene glycol (meth)acrylate. These may be used alone or in combination of two or more.

Examples of the carboxyl group-containing polymerizable unsaturated monomer include (meth)acrylic acid, crotonic acid, maleic acid, fumaric acid, itaconic acid, and half monoalkyl esterified products of the dicarboxylic acids among these acids. Examples of the hydrophilic group-containing polymerizable unsaturated monomer other than those mentioned above include polyalkylene chain containing polymerizable unsaturated monomers such as polyethylene glycol (meth)acrylate and polypropylene glycol (meth)acrylate.

Examples of the aforementioned other polymerizable unsaturated monomer include alkyl esters or cycloalkyl esters having 1 to 24 carbon atoms of (meth)acrylic acids such as methyl (meth)acrylate, ethyl (meth)acrylate, n-propyl (meth)acrylate, i-propyl (meth)acrylate, n-butyl (meth) acrylate, i-butyl (meth)acrylate, t-butyl (meth)acrylate, 2-ethylhexyl (meth)acrylate, cyclohexyl (meth)acrylate, lauryl (meth)acrylate and isobornyl (meth)acrylate; hydroxyalkyl esters of (meth)acrylic acids such as 2-hydroxyethyl (meth)acrylate, 2- or 3-hydroxypropyl (meth)acrylate and 4-hydroxybutyl (meth)acrylate; glycidyl (meth)acrylate, acrylonitrile, acrylamide, styrene, vinyltoluene, vinyl acetate, vinyl chloride, and 1,6-hexanediol diacrylate. These may be used alone or in combination of two or more.

The copolymerization of the above monomer mixture can be conducted by a method known per se, for example, by a solution polymerization method when a water-soluble acrylic resin is desired, or by an emulsion polymerization method when a acrylic resin emulsion is desired.

When the hydroxyl group-containing acrylic resin (X2) is an acrylic resin emulsion obtained by emulsion polymerization, it may be a multilayer-structured particulate emulsion obtained by a multistage emulsion polymerization of the monomer mixture in the presence of water and an emulsifier.

Carboxylic groups of the hydroxyl group-containing acrylic resin (X2) can be neutralized with the above-mentioned basic substance as necessary.

The hydroxyl group-containing acrylic resin (X2) preferably has an acid value usually in the range from 10 mgKOH/g or more to 100 mgKOH/g or less, preferably from 15 mgKOH/g or more to 80 mgKOH/g or less, and particularly from 20 mgKOH/g or more to 60 mgKOH/g or less; and a hydroxyl value usually in the range from 10 mgKOH/g or more to 250 mgKOH/g or less, preferably from 20 mgKOH/g or more to 200 mgKOH/g or less, and particularly 30 mgKOH/g or more 150 mgKOH/g or less.

As the hydroxyl group-containing polyurethane resin (X3), a hydrophilic polyurethane resin that can be dissolved or dispersed in water can be suitably used. For example, preferred is an aqueous dispersion of a self-emulsifying urethane resin that can be obtained by, after or during neutralization, chain elongation and emulsification of a urethane prepolymer obtained by reacting, by a one-shot method or a multistage method, for example (i) aliphatic and/or cycloaliphatic diisocyanates, (ii) a diol having a number average molecular weight of 500 or more and 5,000 or less, (iii) a low molecular weight polyhydroxyl compound, and (iv) a dimethylolalkanoic acid, in an NCO/OH equivalent ratio usually in the range of 1/0.5 or more and 1/0.95 or less, and particularly 1/0.6 or more and 1/0.9 or less; that is produced in particular by distilling off part or all of the organic solvent used in the manufacturing process; and that has a mean particle diameter of 0.001 μm or more and 1.0 μm or less, and particularly 0.02 μm or more and 0.3 μm or less.

The hydroxyl group-containing polyurethane resin (X3) preferably has an acid value usually in the range from 10 mgKOH/g or more to 60 mgKOH/g or less, preferably from 20 mgKOH/g or more to 50 mgKOH/g or less, and particularly from 20 mgKOH/g or more to 40 mgKOH/g or less; and a hydroxyl value usually in the range from 10 mgKOH/g or more to 60 mgKOH/g or less, preferably from 20 mgKOH/g or more to 50 mgKOH/g or less, and particularly 20 mgKOH/g or more to 40 mgKOH/g or less.

The polyisocyanate compound (X4) is a compound having at least two unblocked isocyanate groups in one molecule, examples of which include aliphatic polyisocyanates, alicyclic polyisocyanates, aromatic aliphatic polyisocyanates, aromatic polyisocyanates, and derivatives of these polyisocyanates. Examples of the derivatives of the polyisocyanates include dimers, trimers, biurets, allophanates, uretdiones, isocyanurates, etc. of the above polyisocyanates.

The above polyisocyanates and the derivatives thereof may be used alone or in combination of two or more. Among these polyisocyanates, it is suitable to use an aliphatic diisocyanate, an alicyclic diisocyanate, and derivatives thereof alone or in combination of two or more.

As the polyisocyanate compound (X4), it is preferable to use a water dispersible polyisocyanate compound from the viewpoint of smoothness of an obtained film. The water dispersible polyisocyanate compound may be any polyisocyanate compound without restrictions as long as it can be stably dispersed in an aqueous medium, among which a hydrophilized polyisocyanate compound (X4-1) modified to be hydrophilic, a polyisocyanate compound imparted with water dispersibility by mixing the polyisocyanate compound (X4) and a surfactant in advance, etc. can be suitably used.

Examples of the hydrophilized polyisocyanate compound (X4-1) include an anionic hydrophilized polyisocyanate compound (X4-1-1) obtained by reacting an active hydrogen group of an active hydrogen group-containing compound having an anionic group with an isocyanate group of a polyisocyanate compound, and a nonionic hydrophilized polyisocyanate compound (X4-1-2) obtained by reacting a hydrophilic polyether alcohol such as a polyoxyethylene monoalcohol with a polyisocyanate compound. These may be used alone or in combination of two or more.

The active hydrogen group-containing compound having an anionic group encompasses a compound that has: an anionic group such as a carboxyl group, a sulfonic acid group, a phosphate group and a betaine structure-containing group; and an active hydrogen group such as a hydroxyl group and an amino group that can react with an isocyanate group. By reacting the compound with a polyisocyanate compound, hydrophilicity can be imparted to the polyisocyanate compound. As the anionic hydrophilized polyisocyanate compound (X4-1-1), an anionic hydrophilized polyisocyanate compound having a sulfonic acid group is particularly suitable.

The aqueous two-pack first colored coating material (X) may contain, as appropriate, additives for coating materials such as pigments such as a coloring pigment and an extender pigment, a curing agent other than the polyisocyanate compound (X4) such as a melamine resin, a curing catalyst, a thickener, an ultraviolet absorber, a light stabilizer, an anti-foaming agent, a plasticizer, an organic solvent, a surface conditioner and an anti-settling agent.

The aqueous two-pack first colored coating material (X) can be applied on an article to be coated by a method known per se such as air spray coating, airless spray coating, rotary atomizing coating and curtain coating, and the coating may involve electrostatic application. Among these, the methods of air spray coating, rotary atomizing coating, etc. are preferable. The amount of the application is preferably an amount such that the cured film thickness is usually 10 μm or more and 50 μm or less, and preferably 10 μm or more 40 μm or less.

[Step (2)]

In step (2) of the present disclosure, an aqueous one-pack white color coating material (Y-1) is applied on the uncured first colored coating film obtained in step (1) to form an uncured white coating film.

The aqueous one-pack white color coating material (Y-1) used in the present disclosure preferably contains a hydroxyl group-containing polyester resin (Y1), a hydroxyl group-containing acrylic resin (Y2), a hydroxyl group-containing polyurethane resin (Y3), and a melamine resin (Y4). The aqueous one-pack white color coating material (Y-1) can be prepared by dispersing these resin components and a coloring component such as a coloring pigment and a brilliant pigment in an aqueous medium.

As the hydroxyl group-containing polyester resin (Y1), the hydroxyl group-containing acrylic resin (Y2) and the hydroxyl group-containing polyurethane resin (Y3), those explained above for the hydroxyl group-containing polyester resin (X1), the hydroxyl group-containing acrylic resin (X2) and the hydroxyl group-containing polyurethane resin (X3) can be used as appropriate.

As the melamine resin (Y4), a butyl/methyl mixed etherified melamine resin having a weight average molecular weight in the range from 1,500 or more to 3,000 or less, preferably from 1,500 or more to 2,500 or less, and more preferably from 1,500 or more to 2,000 or less can be used. The mixed etherified melamine resin preferably has an abundance molar ratio of butyl ether groups/methyl ether groups usually in the range from 4/6 or more to 9/1 or less, and particularly in the range from 5/5 or more to 9/1 or less.

Examples of the coloring pigment used in the aqueous one-pack white color coating material (Y-1) include titanium oxide, zinc oxide, and carbon black.

The aqueous one-pack white color coating material (Y-1) may contain, as necessary, appropriate additives for coating materials such as an extender pigment, a curing agent other than the melamine resin (Y4), a curing catalyst, a thickener, an ultraviolet absorber, a light stabilizer, an anti-foaming agent, a plasticizer, an organic solvent, a surface conditioner and an anti-settling agent.

The aqueous one-pack white color coating material (Y-1) can be applied on the first colored coating film by a method known per se such as air spray coating, airless spray coating, rotary atomizing coating and curtain coating, and the coating may involve electrostatic application. Among these, the methods of air spray coating, rotary atomizing coating, etc. are preferable. The amount of the application is preferably an amount such that the cured film thickness is usually 5 μm or more and 30 μm or less, and preferably 10 μm or more 20 μm or less.

In the aqueous one-pack white color coating material (Y-1) of the present disclosure, it is desirable that the water absorption rate of the uncured white coating film at 20° C. is 6.5% or less from the viewpoint of finished appearance, etc.

The water absorption rate of the uncured white coating film is measured as follows. In addition to the application on a regular sheet, the aqueous one-pack white color coating material (Y-1) is also applied on an OHP film (XEROX FILM No. V515, manufactured by Fuji Xerox Co., Ltd.) cut into a size of 10 cm×15 cm, whose mass (W1) is measured in advance. After preheating as necessary, the mass (W2) of the OHP film coated with the aqueous one-pack white color coating material (Y-1) is measured according to the time when the clear coating material is to be applied. The OHP film coated with the aqueous one-pack white color coating material (Y-1) is then immersed in deionized water at 20° C. for 5 minutes and taken out. After lightly wiping excess water adhering to the film with filter paper, the mass (W3) of the OHP film is measured. The water absorption rate is determined from the mass measurement results of W1 to W3 by the following formula (1).

$$\text{Water absorption rate (\%)} = \{(W3 - W2)/(W2 - W1)\} \times 100 \quad (1)$$

[Step (3)]

In step (3) of the present disclosure, the uncured white coating film obtained in step (2) is subject to setting such that a resultant coating film has a solid content of 50% by mass or more.

Note that the "resultant coating film" in step (3) means only an uncured white coating film obtained after the uncured white coating film undergoes the setting.

The setting is usually performed at room temperature, for example, at a temperature of about 24° C. and a humidity of about 70%. Setting time is not particularly limited, but may be 4 minutes or more such that the solid content of the resultant coating film is 50% by mass or more.

Since the solid content in the coating film is increased by setting, not by preheating, it contributes to energy saving.

By obtaining the solid content of the resultant coating film of 50% by mass or more, it is possible to prevent mixing of the above white coating film and an interference color coating film described below, and to form a whitish multilayer film excellent in finished appearance and designability.

[Step (4)]

In step (4) of the present disclosure, an aqueous one-pack interference color coating material (Y-2) is applied on the uncured white coating film with the solid content of 50% by mass or more obtained in step (3) to form an uncured interference color coaling film.

The aqueous one-pack interference color coating material (Y-2) contains a vehicle-forming resin (A) and a titanium oxide-coated alumina flake pigment (B) having a mean particle diameter in the range from 10 μm or more to 14 μm or less.

As the vehicle-forming resin (A), it is preferable to use a base resin and a crosslinker in combination. As the base resin, an acrylic resin, a polyester resin, an alkyd resin, a polyurethane resin, etc. can be used, for example. These may be used alone or in combination of two or more. The base resin preferably has a crosslinkable functional group such as a hydroxyl group.

Examples of the crosslinker include an amino resin, a polyisocyanate compound, a blocked polyisocyanate compound, an epoxy group-containing compound, a carboxyl group-containing compound, a carbodiimide group-containing compound, a hydrazide group-containing compound, and a semicarbazide group-containing compound. Of these, an amino resin, a polyisocyanate compound and a blocked polyisocyanate compound that can react with a hydroxyl group; and a carbodiimide group-containing compound that can react with a carboxyl group are preferable. The crosslinkers may be used alone or in combination of two or more.

The aqueous one-pack interference color coating material (Y-2) contains 15 parts by mass or more and 21 parts by mass or less of the titanium oxide-coated alumina flake pigment (B) having the mean particle diameter in the range from 10 μm or more to 14 μm or less based on 100 parts by mass of the vehicle-forming resin (A); and has a coating material solid content of 18% by mass or more and 22% by mass or less.

The vehicle-forming resin (A) can be used after being dissolved or dispersed in a solvent such as an organic solvent and/or water.

The titanium oxide-coated alumina flake pigment (B) is a pigment that exhibits an interference color by being produced by preferably uniformly coating natural or synthetic alumina flakes (aluminum oxide: $Al_2O_3$) with a metal oxide containing titanium oxide ($TiO_2$) as a main component.

The cured film thickness of the interference color coaling film is 4 μm or more and 7 μm or less from the viewpoint of forming a whitish multilayer film excellent in designability.

[Step (5)]

In step (5) of the present disclosure, a solvent-based two-pack clear coating material (Z) is applied on the uncured interference color coating film obtained in step (4) to form an uncured clear coating film.

The solvent-based two-pack clear coating material (Z) contains a hydroxyl group-containing acrylic resin (Z1) and a polyisocyanate compound (Z2) in a ratio such that isocyanate groups in the polyisocyanate compound (Z2) is 1.5 equivalents or more and 2.0 equivalents or less relative to 1 equivalent of hydroxyl groups in the hydroxyl group-containing acrylic resin (Z1).

The hydroxyl group-containing acrylic resin (Z1) can usually be produced by copolymerizing a hydroxyl group-containing unsaturated monomer and another unsaturated monomer copolymerizable with the hydroxyl group-containing unsaturated monomer by a conventional method. The hydroxyl group-containing unsaturated monomer is a compound having at least one hydroxyl group and at least one polymerizable unsaturated bond in one molecule, examples of which include a monoesterified product of (meth)acrylic acid such as 2-hydroxyethyl (meth)acrylate, 2-hydroxypropyl (meth)acrylate, 3-hydroxypropyl (meth) acrylate or 4-hydroxybutyl (meth)acrylate and a dihydric alcohol having 2 to 8 carbon atoms; an ε-caprolactone modified form of a monoesterified product of (meth)acrylic acid and a dihydric alcohol having 2 to 8 carbon atoms; an allyl alcohol; and (meth)acrylate having a polyoxyethylene chain with a hydroxyl group at the end of the molecule.

Examples of the other unsaturated monomer copolymerizable with the hydroxyl group-containing unsaturated monomer include alkyl esters or cycloalkyl esters having 1 to 24 carbon atoms of (meth)acrylic acid such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth) acrylate, cyclohexyl (meth)acrylate, lauryl (meth)acrylate or isobornyl (meth)acrylate; (meth)acrylic acid, maleic acid, crotonic acid, β-carboxyethyl acrylate; glycidyl (meth)acrylate, acrylonitrile, acrylamide, styrene, and vinyltoluene. These may be used alone or in combination of two or more.

The hydroxyl group-containing acrylic resin (Z1) preferably has a hydroxyl value in the range from 80 mgKOH/g or more to 200 mgKOH/g or less, preferably from 90 mgKOH/g or more to 170 mgKOH/g or less, particularly from 100 mgKOH/g or more to 140 mgKOH/g or less; and an acid value in the range from 1 mgKOH/g or more to 40 mgKOH/g and less, preferably from 3 mgKOH/g to 30 mgKOH/g, particularly from 5 mgKOH/g or more to 20 mgKOH/g or less from the viewpoints of finished appearance such as smoothness and distinctness of image, and film performance such as weather resistance. The hydroxyl group-containing acrylic resin (Z1) preferably has a weight average molecular weight in the range from 4,000 or more to 20,000 or less, preferably in the range from 6,000 or more to 16,000 or less, particularly in the range from 8,000 or more to 12,000 or less from the viewpoints of finished appearance such as smoothness and distinctness of image, and film performance such as weather resistance.

The polyisocyanate compound (Z2) contains a polyisocyanate compound having a uretdione structure and a diisocyanate trimer or higher compound in a solid content mass ratio in the range from 10/90 or more to 50/50 and less, preferably from 15/85 or more to 40/60 or less, and more preferably from 15/85 or more to 35/65 or less. If the content ratio of the polyisocyanate compound having a uretdione structure and the diisocyanate trimer or higher compound is outside the above range, the curability of the finally formed multilayer film and the film performance will be insufficient. Hence, the mass ratio outside the above range is not preferable.

The polyisocyanate compound having a uretdione structure may suitably be a uretdione form of hexamethylene diisocyanate produced by a method known per se. As the diisocyanate trimer or higher compound, an isocyanurate form, a biuret form, or an allophanate form of diisocyanate such as hexamethylene diisocyanate or isophorone diisocyanate can be used, for example.

The usage ratio of the hydroxyl group-containing acrylic resin (Z1) and the polyisocyanate compound (Z2) is preferably selected such that the amount of isocyanate groups in the polyisocyanate compound (Z2) is 1.5 equivalents or more and 1.9 equivalents and less relative to 1 equivalent of hydroxyl groups in the hydroxyl group-containing acrylic resin (Z1) from the viewpoint of ensuring the curability of the multilayer film.

The solvent-based two-pack clear coating material (Z) may contain polysiloxane modified silica particles (Z3) having a mean primary particle diameter of 1 to 40 nm as necessary from the viewpoint of scratch resistance.

The polysiloxane modified silica particles (Z3) are silica particles having a structure in which the particle surface is modified by a polysiloxane chain, and conventionally known ones can be used. Examples of commercially available products include "NANOBYK-3650", "NANOBYK-3651" and "NANOBYK-3652" (trade names, manufactured by BYK).

The mean primary particle diameter refers to a particle diameter (D50) at which the cumulative particle size distribution from the small particle size side is 50% in the volume-based particle size distribution.

The solvent-based two-pack clear coating material (Z) may contain a coloring pigment to a degree that does not interfere with transparency as necessary, and may furthermore contain a body pigment, an ultraviolet absorber, a light stabilizer, an anti-foaming agent, a thickener, a rust inhibitor, a surface conditioner, etc. as appropriate.

The solvent-based two-pack clear coating material (Z) can be applied on the second colored coating film by a method known per se such as air spray coating, airless spray coating, rotary atomizing coating and curtain coating, and the coating may involve electrostatic application. Among these, the methods of air spray coating, rotary atomizing coating, etc. are preferable. The amount of the application is preferably an amount such that the cured film thickness is usually 25 μm or more and 50 μm or less, and preferably 30 μm or more 45 μm or less.

[Step (6)]

In step (6) of the present disclosure, the uncured first colored coating film, the uncured white coating film, the uncured interference color coating film, and the uncured clear coating film formed in steps (1) to (5) are heated at a temperature of 75° C. or more and 100° C. or less to simultaneously cure these coating films.

The curing of the uncured first colored coating film, the uncured white coating film, the uncured interference color coating film, and the uncured clear coating film may be conducted by ordinary means for baking coating films, for example by hot air heating, infrared heating, high-frequency heating, etc. There are no particular restrictions on heating time, but preferably it is usually about 10 to 60 minutes, particularly about 15 to 40 minutes. Such heating can simultaneously cure a multilayer film formed by the uncured first colored coating film, the uncured white coating film, the uncured interference color coating film, and the uncured clear coating film.

More preferably, the heating temperature is 80° C. or more and 90° C. or less.

The multilayer film formed by steps (1) to (6) of the present disclosure has a lightness L* (15°) of 113 or more and 120 or less, a sparkle intensity Si (45°) of 3 or more and 5 or less, and a reciprocal of graininess 1/G of 0.4 or more and 0.5 or less, when measured with a multi-angle spectrocolorimeter, and is whitish and has excellent brilliance.

The lightness L* (15°) is an L* value obtained by: irradiating measurement light from an angle of 45° with respect to an axis perpendicular to a surface to be measured; and measuring light received at an angle of 15° from the specular reflection angle in the direction to the measurement light with a multi-angle spectrocolorimeter (trade name "MA68II", manufactured by X-Rite). The higher the L* (15°) value, the higher lightness and whiter color a resulting coating film has.

The sparkle intensity Si (45°) is a sparkle intensity that can be calculated by: arranging imaging means for capturing an image of a surface to be measured in a direction perpendicular to the plane direction of the surface to be measured; irradiating light onto the surface to be measured from an angle of 45° with respect to the perpendicular direction and capturing an image with the imaging means; and analyzing the image with an image analysis algorithm using the histogram of lightness levels, with a multi-angle colorimeter (manufactured by BYK, trade name: BYK-mac i).

The reciprocal of graininess, 1/G, is the reciprocal of a value indicating graininess, one aspect of the uniformity of light and dark areas, that can be calculated by: sensing an image with a CCD chip under diffused lighting conditions in a white-painted hemisphere; and analyzing the image using the histogram of lightness levels, with a multi-angle colorimeter (manufactured by BYK, trade name: BYK-mac i).

EXAMPLES

The present disclosure will now be explained in detail using Examples and Comparative examples. However, it is to be understood that the present disclosure is not limited only to these Examples. The "parts" and "%" values are all based on mass.

<Production of Aqueous Two-Pack First Colored Coating Material (X)>

Production Example 1

44.2 parts of a hydroxyl group-containing polyester resin solution (a) (20 parts as the resin solid content), 60 parts of "JR-806" (trade name, manufactured by TAYCA CORPORATION, rutile-type titanium dioxide), 1 part of "Carbon MA-100" (trade name, manufactured by Mitsubishi Chemical Corporation, carbon black), 30 parts of "Variace B-35" (trade name, manufactured by SAKAI CHEMICAL INDUSTRY CO., LTD., barium sulfate powder, mean primary particle diameter of 0.5 μm), 5 parts of "MICRO ACE S-3" (trade name, manufactured by NIPPON TALC Co., Ltd., talc powder, mean primary particle diameter of 4.8 μm), and 45 parts of deionized water were mixed, adjusted with 2-(dimethylamino) ethanol to a pH of 8.0, and dispersed in a paint shaker for 30 minutes, to obtain a pigment dispersion paste.

Next, 180 parts of the obtained pigment dispersion paste (20 parts as the resin solid content), 66.7 parts of a hydroxyl group-containing acrylic resin dispersion (b) (20 parts as the resin solid content), 11.1 parts of the hydroxyl group-containing polyester resin solution (a) (5 parts as the resin solid content), 78 parts of "UCOAT UX-5210" (trade name, manufactured by Sanyo Chemical Industries, Ltd., polycarbonate-based aqueous polyurethane resin, solid content of 32%) (25 parts as the resin solid content), 0.1 part of tin catalyst "Scat-1W" (manufactured by DAIICHI SANKYO CHEMICAL PHARMA CO., LTD., trade name, butyltin-based compound), 2-(dimethylamino) ethanol, and deionized water were added to adjust the pH. Furthermore, a sulfonic acid-modified polyisocyanate compound solution (c) was uniformly mixed in an amount such that the NCO/OH ratio was 1.7. Thus, an aqueous first colored coating material (X-1) having a pH of 8.0 and a viscosity of 55 seconds at 20° C. with No. 4 Ford cup was obtained.

Here, the hydroxyl group-containing polyester resin solution (a), the hydroxyl group-containing acrylic resin dispersion (b), and the sulfonic acid-modified polyisocyanate compound solution (c) in Production Example 1 will be described.

(Hydroxyl Group-Containing Polyester Resin Solution (a))

After charging 174 parts of trimethylolpropane, 327 parts of neopentyl glycol, 352 parts of adipic acid, 109 parts of isophthalic acid, and 101 parts of hexahydrophthalic anhydride into a reactor equipped with a thermometer, a thermostat, a stirrer, a reflux condenser and a water separator, the temperature was raised from 160° C. to 230° C. over a period of 3 hours. The temperature was maintained at 230° C. while the generated condensed water was distilled off with the water separator, and the reaction was conducted to an acid value of 3 mgKOH/g or less. After adding 59 parts of trimellitic anhydride to the reaction product and conducting an addition reaction at 170° C. for 30 minutes, 2-(dimethylamino) ethanol was added in an amount equivalent to the acid groups to neutralize, and deionized water was gradually added for water dispersion. Thus, a hydroxyl group-containing polyester resin solution having a solid content concentration of 45% and a pH of 7.2 was obtained. The obtained hydroxyl group-containing polyester resin had an acid value of 35 mgKOH/g, and a hydroxyl value of 130 mgKOH/g.

(Hydroxyl Group-Containing Acrylic Resin Dispersion (b))

After charging 130 parts of deionized water and 0.52 parts of "AQUALON KH-10" (trade name, manufactured by DKS Co. Ltd.) into a reactor equipped with a thermometer, a thermostat, a stirrer, a reflux condenser, a nitrogen inlet tube and a dropper, the mixture was stirred in a nitrogen stream, and the temperature was raised to 80° C. Next, 1% of the total amount of a monomer emulsion (1) described below and 5.3 parts of a 6% ammonium persulfate aqueous solution were introduced into the reactor, and the mixture was maintained at 80° C. for 15 minutes. The remainder of the monomer emulsion (1) was then added dropwise into the reactor maintained at the same temperature over a period of 3 hours, and upon completion of the dropwise addition the mixture was aged for 1 hour. Next, a monomer emulsion (2) described below was added dropwise over a period of 1 hour and aged for 1 hour, and then cooled to 30° C. while gradually adding 40 parts of a 5% dimethylethanolamine aqueous solution into the reactor and discharged while filtering with a 100 mesh nylon cloth, to obtain a hydroxyl group-containing acrylic resin dispersion having a mean particle diameter of 100 nm (measured at 20° C. with a submicron particle size distribution analyzer "COULTER N4" (trade name, manufactured by Beckman Coulter, Inc.) after dilution with deionized water), and a solid content concentration of 30%. The obtained hydroxyl group-containing acrylic resin had an acid value of 33 mgKOH/g, and a hydroxyl value of 25 mgKOH/g.

—Monomer Emulsion (1)—

42 parts of deionized water, 0.72 parts of "Aqualon KH-10", 2.1 parts of methylene bisacrylamide, 2.8 parts of styrene, 16.1 parts of methyl methacrylate, 28 parts of ethyl acrylate, and 21 parts of n-butyl acrylate were mixed and stirred to obtain the monomer emulsion (1).

—Monomer Emulsion (2)—

18 parts of deionized water, 0.31 parts of "Aqualon KH-10", 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed and stirred to obtain the monomer emulsion (2).

(Sulfonic Acid-Modified Polyisocyanate Compound Solution (c))

970 g (5.00 mol) of polyisocyanate containing isocyanurate groups, being based on hexamethylene diisocyanate (HDI), and having an NCO content of 21.7%, an average NCO functionality of 3.5 (by GPC), a monomeric HDI content of 0.1% and a viscosity of 3,000 mPa·s (23° C.); 30 g (0.14 mol) of 3-(cyclohexylamino) propanesulfonic acid; 17.4 g (0.14 mol) of dimethylcyclohexylamine; and 254 g of 1-methoxypropyl 2-acetate were stirred to react at 80° C. for 5 hours under dry nitrogen to obtain a sulfonic acid-modified polyisocyanate compound solution having a solid content of 80% and an NCO percentage of 16.0%.

<Production of Aqueous One-Pack White Color Coating Material (Y-1)>

Production Example 2

44.2 parts of the hydroxyl group-containing polyester resin solution (a) (20 parts as the resin solid content), 100 parts of "JR-806" (trade name, manufactured by TAYCA CORPORATION, rutile-type titanium dioxide), and 45 parts of deionized water were mixed, adjusted with 2-(dimethylamino) ethanol to a pH to 8.0, and dispersed in a paint shaker for 30 minutes, to obtain a pigment dispersion paste.

Next, 12.5 parts of a melamine resin (methyl-butyl mixed etherified melamine resin) having a solid content of 80% (10 parts as the resin solid content), 183 parts of the hydroxyl group-containing acrylic resin dispersion (b) (55 parts as the resin solid content), and 31 parts of "UCOAT UX-5210" (trade name, manufactured by Sanyo Chemical Industries, Ltd., polycarbonate-based aqueous polyurethane resin, solid content of 32%) (10 parts as the resin solid content) were added to 189.2 parts of the obtained pigment dispersion paste (20 parts as the resin solid content) and 7.1 parts of a hydroxyl group-containing polyester resin (d) (5 parts as the resin solid content), while stirring. Furthermore, dimethylethanolamine and deionized water were added to adjust to a pH of 8.0 and a viscosity of 50 seconds at 20° C. with No. 4 Ford Cup to obtain an aqueous white color coating material (Y-1-1). The water absorption rate of an uncured white coating film of this coating material was 5.7% at 20° C.

Here, the hydroxyl group-containing polyester resin (d) in Production Example 2 will be described.

(Hydroxyl Group-Containing Polyester Resin (d))

After charging 109 parts of trimethylolpropane, 141 parts of 1,6-hexanediol, 126 parts of hexahydrophthalic anhydride, and 120 parts of adipic acid into a reactor equipped with a thermometer, a thermostat, a stirrer, a reflux condenser and a water separator, the temperature was raised from 160° C. to 230° C. over a period of 3 hours, and condensation reaction was conducted at 230° C. for 4 hours. Next, 38.3 parts of trimellitic anhydride was further added to add carboxyl groups to the obtained condensation reaction product, and reaction was conducted at 170° C. for 30 minutes, after which the mixture was diluted with 2-ethyl-1-hexanol, to obtain a hydroxyl group-containing polyester resin solution having a resin solid concentration of 70%. The obtained hydroxyl group-containing polyester resin had an acid value of 46 mgKOH/g, and a hydroxyl value of 150 mgKOH/g.

<Production of Aqueous One-Pack Interference Color Coating Material (Y-2)>

Production Example 3

12.5 parts of a melamine resin (methyl-butyl mixed etherified melamine resin) having a solid content of 80% (10 parts as the resin solid content), 183 parts of the hydroxyl group-containing acrylic resin dispersion (b) (55 parts as the resin solid content), and 31 parts of "UCOAT UX-5210" (trade name, manufactured by Sanyo Chemical Industries, Ltd., polycarbonate-based aqueous polyurethane resin, solid content of 32%) (10 parts as the resin solid content) were added to 35.7 parts of the hydroxyl group-containing polyester resin (d) (25 parts as the resin solid content) while stirring. Then, 15 parts of a light interference pigment "Xirallic T61-10 Micro Silver" (trade name, manufactured by Merck, titanium oxide-coated alumina flake pigment, mean particle size of 11.8 μm) were added while stirring, and mixed and dispersed. Furthermore, "PRIMAL ASE-60" (trade name, manufactured by The Dow Chemical Company, a thickener), dimethylethanolamine, and deionized water were added to adjust to a pH of 8.0, a coating material solid content of 20%, and a viscosity of 45 seconds at 20° C. with No. 4 Ford Cup to obtain an aqueous interference color coating material (Y-2-1).

Production Examples 4 to 14

Aqueous interference color coating materials (Y-2-2) to (Y-2-12) having a pH of 8.0 and a viscosity of 50 seconds at 20° C. with No. 4 Ford cup were obtained in the same manner as in Production Example 3, except that the type and content of the light interference pigment, and the coating material solid content were changed as shown in Table 1 below.

TABLE 1

| | | | Production Examples | | | | | | | | | | | |
|---|---|---|---|---|---|---|---|---|---|---|---|---|---|---|
| | | | 3 | 4 | 5 | 6 | 7 | 8 | 9 | 10 | 11 | 12 | 13 | 14 |
| Aqueous interference color coating material (Y-2) name | | | Y-2-1 | Y-2-2 | Y-2-3 | Y-2-4 | Y-2-5 | Y-2-6 | Y-2-7 | Y-2-8 | Y-2-9 | Y-2-10 | Y-2-11 | Y-2-12 |
| Light interference pigment | Titanlum oxide-coated alumina flake pigment (B) with mean particle diameter in the range from 10 μm or more to 14 μm or less | [Xirallic T61-10 Micro Silver] | 15 | 16 | 18 | 18 | 18 | 20 | 21 | 13 | 23 | 18 | 18 | |
| | Titanium oxide-coated alumina flake pigment | [Xirallic T60-10 Crystal Silver] (Note 1) | | | | | | | | | | | | 18 |
| Coating material solid content [%] | | | 20 | 20 | 18 | 20 | 22 | 20 | 20 | 20 | 20 | 16 | 24 | 20 |

(Note 1)
Xirallic T60-10 Crystal Silver: trade name, manufactured by Merck, titanium oxide-coated alumina flake pigment, mean particle size of 18.5 μm <Production of Solvent-Based Two-Pack Clear Coating Material (Z)>

Production Example 15

An isocyanate crosslinking agent (Z2-1) (consisting of 20% uretdione form and 80% trimer or higher of hexamethylene diisocyanate, NCO content of 20%, viscosity of 800 mPa·s/25° C.) was uniformly mixed with 70 parts by mass as the solid content of a hydroxyl group-containing acrylic resin (e) in an amount such that the NCO/OH ratio was 1.7. The mixture was then mixed with an organic solvent (a SOLVESSO 100/methoxypropylacetate equal mass mixture) and adjusted to a viscosity of 20 seconds at 20° C. with No. 4 Ford Cup to obtain a clear coating material (Z-1).

Here, the hydroxyl group-containing acrylic resin (e) in Production Example 15 will be described.

(Hydroxyl Group-Containing Acrylic Resin (e))

The hydroxyl group-containing acrylic resin (e) is an acrylic resin that is obtained by a radical polymerization reaction of 25 parts of styrene, 20 parts of n-butyl methacrylate, 30 parts of n-butyl acrylate, 24 parts of hydroxyethyl methacrylate, and 1 part of acrylic acid by a conventional method, and that has a hydroxyl value of 120 mgKOH/g, and a weight average molecular weight of 8,000.

Production Example 16

A clear coating material (Z-2) was obtained in the same manner as in Production Example 15, except that the amount of the isocyanate crosslinking agent (Z2-1) was changed such that the NCO/OH ratio was 1.5.

Production Example 17

A clear coating material (Z-3) was obtained in the same manner as in Production Example 15, except that 2 parts of "NANOBYK-3652" (trade name, linear alkyl group-modified polydimethylsiloxane-modified silica particle dispersion, mean particle diameter of 20 nm, solid content concentration of 31% (silica particle concentration: 25%), manufactured by BYK) were added.

Production Example 18

An isocyanate crosslinking agent (Z2-2) (consisting of less than 1% uretdione form and 99% or more trimer or higher of hexamethylene diisocyanate, NCO content of 20%, viscosity of 1,200 mPa·s/25° C.) was uniformly mixed with 70 parts by mass as the solid content of the hydroxyl group-containing acrylic resin (e), in an amount such that the NCO/OH ratio was 1.7. The mixture was then mixed with an organic solvent (a toluene/xylene equal mass mixture) and adjusted to a viscosity of 14 seconds at 20° C. with No. 4 Ford Cup to obtain a clear coating material (Z-4).

Production Example 19

A clear coating material (Z-5) was obtained in the same manner as in Production Example 15, except that the amount of the isocyanate crosslinking agent (Z2-1) was changed such that the NCO/OH ratio was 1.2.

Production Example 20

A clear coating material (Z-6) was obtained in the same manner as in Production Example 15, except that the amount of the isocyanate crosslinking agent (Z2-1) was changed such that the NCO/OH ratio was 2.2.

<Fabrication of Test Sheets 1 and 2>

As a metal member, a zinc phosphate-treated cold rolled steel sheet (450 mm×300 mm×0.8 mm) was electrodeposited with a thermosetting epoxy resin based cationic electrodeposition coating composition (trade name, "Elecron NT-360", Kansai Paint Co., Ltd.) to a film thickness of 20 μm, and heated at 170° C. for 30 minutes for curing.

As a plastic member, a polypropylene sheet (which had been degreased) was air-sprayed with a primer "SOFLEX 3100" (trade name, manufactured by Kansai Paint Co., Ltd.) to a dry film thickness of 7 μm, and heated at 80° C. for 30 minutes for curing. The surfaces of the metal member and the plastic member were degreased, and these were placed adjacent to each other to fabricate a test sheet 1.

As another plastic member, a NORYL GTX sheet (which had been degreased) was air-sprayed with the primer "SOFLEX 3100" (trade name, manufactured by Kansai Paint Co., Ltd.) to a dry film thickness of 7 μm, and heated at 80° C. for 30 minutes for curing. The surfaces of the metal member and this plastic member were degreased, and these were placed adjacent to each other to fabricate a test sheet 2.

<Fabrication of Test Coated Sheets>

Example 1

The above test sheet was electrostatically coated with the aqueous first colored coating material (X-1) to a dry film thickness of 20 μm, and after setting at room temperature for 3 minutes, the aqueous white color coating material (Y-1-1) was electrostatically applied to a dry film thickness of 10 μm and set at room temperature for 5 minutes such that the solid content of a resultant coating film was 55% by mass. As described later, the aqueous white color coating material (Y-1-1) was also applied on aluminum foil for measurement of the solid content of a resultant coating film, under the same coating conditions, and the solid content after setting at room temperature for 5 minutes was measured. Then, the aqueous interference color coating material (Y-2-1) was electrostatically applied to a dry film thickness of 5 μm, allowed to stand at room temperature for 3 minutes, and then pre-dried at 80° C. for 5 minutes. Next, the clear coating material (Z-1) was electrostatically applied to a dry film thickness of 35 μm, allowed to stand at room temperature for 5 minutes, and then heated in an oven at 85° C. for 20 minutes to obtain a test coated sheet of Example 1 on which a multilayer film was formed.

Measurement of the solid content of a resultant coating film: The aqueous white color coating material (Y-1-1) was applied on aluminum foil whose mass (M1) was measured in advance, and after five minutes from the application of the aqueous white color coating material (Y-1-1) on the aluminum foil, the aluminum foil was collected and its mass (M2) was measured. Next, the collected aluminum foil was dried at 110° C. for 60 minutes, allowed to stand and cooled to room temperature in a desiccator, and then the mass (M3) of the aluminum foil was measured. The solid content of a resultant coating film was determined according to the following formula.

$$\text{Solid content of resultant coating film (mass \%)} = \{(M3 - M1)/(M2 - M1)\} \times 100$$

Examples 2 to 13 and Comparative Examples 1 to 11

Test coated sheets of Examples 2 to 13 and Comparative Examples 1 to 11 were obtained in the same manner as in Production Example 1, except that the setting time of the aqueous white color coating material, the type and dry film thickness of the aqueous interference color coating material, and the type of the clear coating material were changed as shown in Tables 2 to 4 below.

[Evaluation]

The following film performance tests were conducted on the test coated sheets of Examples and Comparative Examples. The evaluation results are also shown in Table 2 to Table 4.

(Smoothness)

The finished appearance of each coated test sheet was evaluated based on smoothness. Using the Wd value measured by "Wave Scan DOI" (trade name, manufactured by BYK Gardner), evaluation was made according to the following criteria. The smaller the Wd value, the higher the smoothness of a coated surface.

—Evaluation Criteria—

AA: The Wd value is less than 5.0.

A: The Wd value is 5.0 or more and 10.0 or less.

C: The Wd value exceeds 10.0.

(Water Resistance Test: Blisters)

A portion of each test coated sheet was cut out, immersed in warm water at 40° C. for 10 days, raised out and dried, The coated surface after being raised out was visually observed, and the occurrence of blisters was evaluated using the following criteria.

—Evaluation Criteria—

A: No blister occurred.

B: Some blisters occurred.

C: Blisters occurred on the entire surface.

(Water Resistance Test: Adhesiveness)

A portion of each test coated sheet was cut out, immersed in warm water at 40° C. for 10 days, raised out and dried. the adhesiveness was evaluated as follows.

Notches were formed on the film surface of each test sheet up to the base using a cutter to produce a square grid with 100 squares of size 2 mm×2 mm. Adhesive tape was attached to the surface, and the number of film squares left after rapidly peeling off the tape at 20° C. was determined and evaluated using the following criteria.

—Evaluation Criteria—

AA: 100 squares (no peeling)

A: 100 squares (including squares partially peeled)

B: 51 squares or more and 99 squares or less

C: 50 squares or less (Recoat Adhesiveness)

Each test coated sheet was allowed to stand at room temperature for 7 days, and the same coating material was reapplied on the coated surface and cured. After being allowed to stand at room temperature for 3 days, the adhesiveness was evaluated as described above, and the number of film squares left was determined and evaluated using the following criteria.

—Evaluation Criteria—

AA: 100 squares (no peeling)

A: 100 squares (including squares partially peeled)

B: 51 squares or more and 99 squares or less

C: 50 squares or less (Designability)

—Lightness L* (15°)—

For each test coated sheet, L* (15°) was measured using "MA68II" (trade name, manufactured by X-Rite), and the lightness L* (15°) of the film was evaluated. More specifically, measurement light was irradiated at an angle of 45° with respect to the axis perpendicular to a surface to be measured, and the lightness L* was measured for light received at an angle of 15° from the specular reflection angle in the direction to the measurement light.

—Sparkle intensity Si (45°)—

For each test coated sheet, the sparkle intensity Si (45°) was measured using "BYK-mac I" (trade name, manufactured by BYK) and evaluated. More specifically, the sparkle intensity Si (45°) was calculated by arranging a CCD chip for capturing an image of a surface to be measured in a direction perpendicular to the plane direction of the surface to be measured; capturing an image of each surface to be measured with the CCD chip using light irradiated onto the surface to be measured from an angle of 45° with respect to the perpendicular direction; and analyzing the obtained image with an image analysis algorithm using the histogram of lightness levels.

—Reciprocal of Graininess 1/G—

For each test coated sheet, the reciprocal of graininess 1/G was measured using "BYK-mac I" (trade name, manufactured by BYK) and evaluated. More specifically, the reciprocal of graininess 1/G was calculated by sensing an image with a CCD chip under diffused lighting conditions in a white-painted hemisphere and analyzing the image using the histogram of lightness levels.

TABLE 2

| | | Examples | | | | | | |
|---|---|---|---|---|---|---|---|---|
| | | 1 | 2 | 3 | 4 | 5 | 6 | 7 |
| Test sheet type | | 1 | 1 | 2 | 1 | 1 | 1 | 1 |
| Aqueous first colored coating material type | | X-1 | X-1 | X-1 | X-1 | X-1 | X-1 | X-1 |
| Aqueous white color coating material type | | Y-1-1 | Y-1-1 | Y-1-1 | Y-1-1 | Y-1-1 | Y-1-1 | Y-1-1 |
| Setting time of white coating film (min) | | 5 | 5 | 5 | 5 | 5 | 5 | 5 |
| Solid content of resultant coating film (mass %) | | 55 | 55 | 55 | 55 | 55 | 55 | 55 |
| Aqueous interference color coating material type | | Y-2-1 | Y-2-2 | Y-2-2 | Y-2-2 | Y-2-2 | Y-2-3 | Y-2-4 |
| Dry film thickness of interference color coating film (μm) | | 5 | 5 | 5 | 4 | 7 | 5 | 5 |
| Clear coating material type | | Z-1 | Z-1 | Z-1 | Z-1 | Z-1 | Z-1 | Z-1 |
| Smoothness | | AA | AA | AA | AA | AA | AA | AA |
| Water resistance test: blisters | | A | A | A | A | A | A | A |
| Water resistance test: adhesiveness | | AA | AA | AA | AA | AA | AA | AA |
| Recoat adhesiveness | | AA | AA | AA | AA | AA | AA | AA |
| Designability | Lightness L* (15°) | 114 | 117 | 118 | 114 | 119 | 120 | 118 |
| | Sparkle intensity Si (45°) | 3.5 | 4.1 | 4.2 | 3.5 | 4.6 | 4.7 | 4.5 |
| | Reciprocal of graininess 1/G | 0.48 | 0.43 | 0.44 | 0.48 | 0.45 | 0.49 | 0.45 |

TABLE 3

| | Examples | | | | | |
|---|---|---|---|---|---|---|
| | 8 | 9 | 10 | 11 | 12 | 13 |
| Test sheet type | 1 | 1 | 1 | 1 | 1 | 2 |
| Aqueous first colored coating material type | X-1 | X-1 | X-1 | X-1 | X-1 | X-1 |
| Aqueous white color coating material type | Y-1-1 | Y-1-1 | Y-1-1 | Y-1-1 | Y-1-1 | Y-1-1 |
| Setting time of white coating film (min) | 5 | 5 | 5 | 5 | 5 | 5 |
| Solid content of resultant coating film (mass %) | 55 | 55 | 55 | 55 | 55 | 55 |
| Aqueous interference color coating material type | Y-2-5 | Y-2-6 | Y-2-7 | Y-2-2 | Y-2-2 | Y-2-2 |
| Dry film thickness of interference color coating film (μm) | 5 | 5 | 5 | 5 | 5 | 5 |
| Clear coating material type | Z-1 | Z-1 | Z-1 | Z-2 | Z-3 | Z-3 |
| Smoothness | AA | AA | AA | AA | AA | AA |

TABLE 3-continued

| | | Examples | | | | | |
|---|---|---|---|---|---|---|---|
| | | 8 | 9 | 10 | 11 | 12 | 13 |
| Water resistance test: blisters | | A | A | A | A | A | A |
| Water resistance test: adhesiveness | | AA | AA | AA | AA | AA | AA |
| Recoat adhesiveness | | AA | AA | AA | AA | AA | AA |
| Designability | Lightness L* (15°) | 117 | 120 | 120 | 117 | 117 | 118 |
| | Sparkle intensity Si (45°) | 4 | 4.9 | 4.9 | 4.1 | 4.1 | 4.2 |
| | Reciprocal of graininess 1/G | 0.42 | 0.45 | 0.42 | 0.43 | 0.43 | 0.44 |

TABLE 4

| | | Comparative Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Test sheet type | | 1 | 1 | 1 | 1 | 1 | 1 | 1 | 1 | 1 | 1 | 1 |
| Aqueous first colored coating material type | | X-1 | X-1 | X-1 | X-1 | X-1 | X-1 | X-1 | X-1 | X-1 | X-1 | X-1 |
| Aqueous white color coating material type | | Y-1-1 | Y-1-1 | Y-1-1 | Y-1-1 | Y-1-1 | Y-1-1 | Y-3-1 | Y-1-1 | Y-1-1 | Y-1-1 | Y-1-1 |
| Setting time of white coating film (min) | | 5 | 5 | 5 | 5 | 5 | 3 | 5 | 5 | 5 | 5 | 5 |
| Solid content of resultant coating film (mass %) | | 55 | 55 | 55 | 55 | 55 | 48 | 55 | 55 | 55 | 55 | 55 |
| Aqueous interference color coating material type | | Y-2-8 | Y-2-9 | Y-2-10 | Y-2-11 | Y-2-12 | Y-2-2 | Y-2-2 | Y-2-2 | Y-2-2 | Y-2-2 | Y-2-2 |
| Dry film thickness of interference color coating film (μm) | | 5 | 5 | 5 | 5 | 5 | 5 | 3 | 8 | 5 | 5 | 5 |
| Clear coating material type | | Z-1 | 2-1 | 2-1 | Z-1 | 2-1 | Z-1 | 2-1 | Z-1 | Z-4 | Z-5 | 2-6 |
| Smoothness | | AA | A | AA | AA | AA | AA | AA | AA | A | A | AA |
| Water resistance test: blisters | | A | B | A | A | A | A | A | A | B | B | A |
| Water resistance test: adhesiveness | | AA | B | AA | AA | AA | AA | AA | AA | B | B | AA |
| Recoat adhesiveness | | AA | AA | AA | AA | AA | AA | AA | AA | AA | AA | B |
| Designability | Lightness L* (15°) | 112 | 124 | 124 | 110 | 125 | 112 | 110 | 125 | 117 | 117 | 117 |
| | Sparkle intensity Si (45°) | 2.9 | 5.5 | 5.5 | 2.9 | 5.5 | 2.9 | 2.9 | 5 | 4.1 | 4.1 | 4.1 |
| | Reciprocal of graininess 1/G | 0.43 | 0.45 | 0.55 | 0.37 | 0.3 | 0.39 | 0.47 | 0.35 | 0.43 | 0.43 | 0.43 |

As shown in Tables 2 and 3, it was found that Examples formed by the method for forming the multilayer film of the present disclosure were excellent in smoothness, water resistance test, recoat adhesiveness, and designability.

On the other hand, as shown in Table 4, Comparative Example 1, in which the content of the titanium oxide-coated alumina flake pigment (B) having a mean particle diameter in the range from 10 μm or more to 14 μm or less in the aqueous one-pack interference color coating material (Y-2) was 13 parts by mass had inferior designability.

Comparative Example 2, in which the content of the titanium oxide-coated alumina flake pigment (B) having a mean particle diameter in the range from 10 μm or more to 14 μm or less in the aqueous one-pack interference color coating material (Y-2) was 23 parts by mass had inferior designability and water resistance test (blisters, adhesiveness).

Comparative Example 3, in which the coating material solid content in the aqueous one-pack interference color coating material (Y-2) was 16% had inferior designability.

Comparative Example 4, in which the coating material solid content in the aqueous one-pack interference color coating material (Y-2) was 24% had inferior designability.

Comparative Example 5, in which the titanium oxide-coated alumina flake pigment was used in the aqueous one-pack interference color coating material (Y-2) had inferior designability.

Comparative Example 6, in which the setting time of the white coating film was 3 minutes and the solid content of the resultant coating film was 48% by mass had inferior designability Comparative Example 7, in which the cured film thickness of the interference color coating film was 3 μm had inferior designability.

Comparative Example 8, in which the cured film thickness of the interference color coating film was 8 μm had inferior designability.

Comparative Example 9, in which the solid content mass ratio of the polyisocyanate compound having a uretdione structure and the diisocyanate trimer or higher compound in the solvent-based two-pack clear coating material (Z) was less than 1/99 had inferior water resistance (blister, adhesiveness).

Comparative Example 10, in which the NCO/OH ratio in the solvent-based two-pack clear coating material (Z) was 1.2 had inferior water resistance (blister, adhesiveness).

Comparative Example 11, in which the NCO/OH ratio in the solvent-based two-pack clear coating material (Z) was 2.2 had inferior recoat adhesiveness.

The invention claimed is:

1. A method for forming a multilayer film, comprising:

a step (1) of applying an aqueous two-pack first colored coating material on both a metal member and a plastic member of an automobile outer panel to form an uncured first colored coating film;

a step (2) of applying an aqueous one-pack white color coating material on the uncured first colored coating film obtained in the step (1) to form an uncured white coating film;

a step (3) of setting the uncured white coating film obtained in the step (2) such that a resultant coating film has a solid content of 50% by mass or more;

a step (4) of applying an aqueous one-pack interference color coating material on the uncured white coating film having the solid content of 50% by mass or more obtained in the step (3) to form an uncured interference color coating film;

a step (5) of applying a solvent-based two-pack clear coating material on the uncured interference color coating film obtained in the step (4) to form an uncured clear coating film; and a step (6) of heating the uncured first colored coating film, the uncured white coating film, the uncured interference color coating film, and the uncured clear coating film formed in the steps (1) to (5) at a temperature of 75° C. or more and 100° C. or less to simultaneously cure these coating films to form a multilayer film, wherein the aqueous one-pack interference color coating material contains a vehicle-forming resin, and a titanium oxide-coated alumina flake pigment having a mean particle diameter in the range from 10 μm or more to 14 μm or less; the aqueous one-pack interference color coating material contains 15 parts by mass or more and 21 parts by mass or less of the titanium oxide-coated alumina flake pigment based on 100 parts by mass of the vehicle-forming resin; and the aqueous one-pack interference color coating material has a coating material solid content of 18% by mass or more and 22% by mass or less, wherein the interference color coating film has a cured film thickness of 4 μm or more and 7 μm or less, wherein the solvent-based two-pack clear coating material contains a hydroxyl group-containing acrylic resin and a polyisocyanate compound in a ratio such that isocyanate groups in the polyisocyanate compound is 1.5 equivalents or more and 2.0 equivalents or less relative to 1 equivalent of hydroxyl groups in the hydroxyl group-containing acrylic resin, and the polyisocyanate compound contains a polyisocyanate compound having a uretdione structure and a diisocyanate trimer or higher compound in a solid content mass ratio of 10/90 or more and 50/50 or less, and wherein the multilayer film has a lightness L* (15°) of 113 or more and 120 or less, a sparkle intensity Si (45°) of 3 or more and 5 or less, and a reciprocal of graininess 1/G of 0.4 or more and 0.5 or less, when measured by a multi-angle colorimeter.

2. The method for forming the multilayer film according to claim 1, wherein the aqueous one-pack white color coating material contains a hydroxyl group-containing polyester resin, a hydroxyl group-containing acrylic resin, a hydroxyl group-containing polyurethane resin, and a melamine resin, and wherein the uncured white coating film has a water absorption rate of 6.5% or less at 20° C.

3. The method for forming the multilayer film according to claim 1, wherein the plastic member is coated with a primer in advance.

4. The method for forming the multilayer film according to claim 1, wherein the plastic member is made of a composite material of a polyamide resin and a modified polyphenylene ether resin.

5. The method for forming the multilayer film according to claim 1, wherein the solvent-based two-pack clear coating material further contains polysiloxane modified silica particles having a mean primary particle diameter of 1 nm or more and 40 nm or less.

6. A multilayer film obtained by the method for forming the multilayer film according to claim 1.

7. A multilayer film obtained by the method for forming the multilayer film according to claim 2.

8. A multilayer film obtained by the method for forming the multilayer film according to claim 3.

9. A multilayer film obtained by the method for forming the multilayer film according to claim 4.

10. A multilayer film obtained by the method for forming the multilayer film according to claim 5.

* * * * *